(12) United States Patent
Futagi et al.

(10) Patent No.: US 8,908,655 B2
(45) Date of Patent: Dec. 9, 2014

(54) RADIO COMMUNICATION SYSTEM, MOBILE STATION APPARATUS, AND RACH TRANSMISSION METHOD

(75) Inventors: Sadaki Futagi, Ishikawa (JP); Takashi Iwai, Ishikawa (JP); Daichi Imamura, Kanagawa (JP); Kenichi Miyoshi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 1135 days.

(21) Appl. No.: 12/298,693

(22) PCT Filed: Apr. 26, 2007

(86) PCT No.: PCT/JP2007/059088
§ 371 (c)(1),
(2), (4) Date: Feb. 2, 2009

(87) PCT Pub. No.: WO2007/126013
PCT Pub. Date: Nov. 8, 2007

(65) Prior Publication Data
US 2009/0213813 A1 Aug. 27, 2009

(30) Foreign Application Priority Data
Apr. 28, 2006 (JP) .................. 2006-126455

(51) Int. Cl.
*H04J 3/00* (2006.01)
*H04J 13/00* (2011.01)
*H04L 1/18* (2006.01)
*H04W 72/06* (2009.01)
*H04W 74/08* (2009.01)

(52) U.S. Cl.
CPC .......... *H04J 13/0059* (2013.01); *H04L 1/1893* (2013.01); *H04W 72/06* (2013.01); *H04W 74/0866* (2013.01)
USPC ....................................... 370/336

(58) Field of Classification Search
USPC .................................. 370/336, 345
See application file for complete search history.

(56) References Cited

U.S. PATENT DOCUMENTS 6,597,675 B1 7/2003 Esmailzadeh
6,606,313 B1 8/2003 Dahlman
(Continued)

FOREIGN PATENT DOCUMENTS

EP 1 758 415 2/2007
JP 2001-298770 10/2001
(Continued)

OTHER PUBLICATIONS

Roberson, J. et al., "Integration of Hybrid ARQ and Space-Time Coding through Embedded Quasi-Orthogonal Block Codes", Information Sciences and Systems, 2006 40th Annual Conference on, Mar. 22-24, 2006, pp. 547-551.*

(Continued)

*Primary Examiner* — Brandon Renner
*Assistant Examiner* — Scott M Sciacca
(74) *Attorney, Agent, or Firm* — Dickinson Wright PLLC

(57) ABSTRACT

Provided is a mobile station device capable of performing RACH transmission with a small amount of resources. In this device, a RACH generating unit (111) is formed by a signature selection unit (112) and a modulation unit (113). A RACH signal is generated as follows. That is, according to inputted RACH re-transmission quantity information, the signature selection unit (112) selects one code sequence as a signature from a plurality of different code sequences. The modulation unit (113) modulates the signature (code sequence) and generates a RACH signal. A multiplexing unit (116) time-multiplexes the RACH signal inputted from the modulation unit (113) and user data inputted from the modulation unit (115). A radio transmission unit (117) subjects the multiplexed signal to radio processing and transmits it via an antenna (121).

5 Claims, 10 Drawing Sheets

(56) References Cited

U.S. PATENT DOCUMENTS

| | | |
|---|---|---|
| 6,985,474 B2 | 1/2006 | Dahlman |
| 7,263,084 B2 | 8/2007 | Miyoshi |
| 2001/0024956 A1 | 9/2001 | You |
| 2003/0114113 A1* | 6/2003 | Kornprobst ............... 455/69 |
| 2003/0223452 A1* | 12/2003 | Toskala et al. ............ 370/442 |
| 2004/0008658 A1 | 1/2004 | Dahlman |
| 2004/0114549 A1 | 6/2004 | Miyoshi |
| 2004/0157602 A1* | 8/2004 | Khawand ................ 455/434 |
| 2005/0041588 A1* | 2/2005 | Kim et al. ............... 370/236 |
| 2005/0054288 A1* | 3/2005 | Agarwal ................ 455/13.1 |
| 2005/0232158 A1* | 10/2005 | Hondo ................... 370/241 |
| 2006/0126573 A1* | 6/2006 | Dick et al. ............... 370/335 |
| 2007/0002786 A1* | 1/2007 | Herrmann ............... 370/328 |
| 2007/0064665 A1* | 3/2007 | Zhang et al. ............. 370/343 |
| 2007/0147326 A1* | 6/2007 | Chen ...................... 370/338 |
| 2007/0165567 A1* | 7/2007 | Tan et al. ................ 370/329 |
| 2007/0195730 A1* | 8/2007 | Cheng et al. ............. 370/329 |
| 2008/0032630 A1* | 2/2008 | Kim et al. ............... 455/45 |
| 2008/0318567 A1* | 12/2008 | Popovic et al. .......... 455/422.1 |
| 2009/0040973 A1* | 2/2009 | Iwai et al. ............... 370/329 |
| 2013/0010729 A1* | 1/2013 | Novak et al. ............ 370/329 |

FOREIGN PATENT DOCUMENTS

| | | |
|---|---|---|
| JP | 2002-524990 | 8/2002 |
| JP | 2002-527967 | 8/2002 |
| JP | 2003-218830 | 7/2003 |
| JP | 2006-054860 | 2/2006 |
| JP | 2006-081013 | 3/2006 |

OTHER PUBLICATIONS

International Search Report dated Aug. 21, 2007.

3GPP TSG-RAN WG1 LTE Ad Hoc Meeting, R1-060047, NTT DoCoMo, NEC, Sharp, "Random Access Transmission in E-UTRA Uplink," Helsinki, Finland, Jan. 23-25, 2006, pp. 1-8.

3GPP TSG-RAN WG1 LTE Ad Hoc Meeting, R1-060046, NTT DoCoMo, NEC, Sharp, "Orthogonal Pilot Channel Structure in E-UTRA Uplink," Helsinki, Finland, Jan. 23-25, 2006, pp. 1-8.

* cited by examiner

| SIGNATURE NUMBER | INITIAL TRANSMISSION (FIRST TRANSMISSION) | RETRANSMISSION (SECOND TRANSMISSION) |
|---|---|---|
| # 1 | CAZAC (0, 0) | CAZAC (1, 0) |
| # 2 | CAZAC (0, 1) | CAZAC (1, 1) |
| # 3 | CAZAC (0, 2) | CAZAC (1, 2) |
| # 4 | CAZAC (0, 3) | CAZAC (1, 3) |
| # 5 | CAZAC (0, 4) | CAZAC (1, 4) |
| # 6 | CAZAC (0, 5) | CAZAC (1, 5) |
| # 7 | CAZAC (0, 6) | CAZAC (1, 6) |
| # 8 | CAZAC (0, 7) | CAZAC (1, 7) |

FIG.3

| SIGNATURE NUMBER | PRIORITY OF RANDOM ACCESS | INITIAL TRANSMISSION (FIRST TRANSMISSION) | RETRANSMISSION (SECOND TRANSMISSION) | RETRANSMISSION (THIRD TRANSMISSION) |
|---|---|---|---|---|
| # 1 | HIGH | CAZAC (0, 0) | CAZAC (1, 0) | CAZAC (1, 4) |
| # 2 | HIGH | CAZAC (0, 1) | CAZAC (1, 1) | CAZAC (1, 5) |
| # 3 | MEDIUM | CAZAC (0, 2) | CAZAC (1, 2) | × |
| # 4 | MEDIUM | CAZAC (0, 3) | CAZAC (1, 3) | × |
| # 5 | LOW | CAZAC (0, 4) | × | × |
| # 6 | LOW | CAZAC (0, 5) | × | × |

FIG.6

| SIGNATURE NUMBER | PRIORITY OF RANDOM ACCESS | FIRST TRANSMISSION | SECOND TRANSMISSION | THIRD TRANSMISSION | FOURTH TRANSMISSION | TOTAL NUMBER OF SLOTS |
|---|---|---|---|---|---|---|
| # 1 | HIGH | CAZAC (0, 0) # 1 | CAZAC (0, 0) # 2 | CAZAC (0, 0) # 3 | CAZAC (0, 0) # 4 | 4 |
| # 2 | HIGH | CAZAC (0, 1) # 1 | CAZAC (0, 1) # 2 | CAZAC (0, 1) # 3 | CAZAC (0, 1) # 4 | 4 |
| # 3 | MEDIUM | CAZAC (0, 2) # 1, # 3 | CAZAC (0, 2) # 2, # 4 | CAZAC (0, 2) # 1, # 3 | CAZAC (0, 2) # 2, # 4 | 2 |
| # 4 | MEDIUM | CAZAC (0, 3) # 1, # 3 | CAZAC (0, 3) # 2, # 4 | CAZAC (0, 3) # 1, # 3 | CAZAC (0, 3) # 2, # 4 | 2 |
| # 5 | LOW | CAZAC (0, 4) # 1, # 3 | CAZAC (0, 4) # 1, # 3 | CAZAC (0, 4) # 1, # 3 | CAZAC (0, 4) # 1, # 3 | 1 |
| # 6 | LOW | CAZAC (0, 5) # 1, # 4 | CAZAC (0, 5) # 1, # 4 | CAZAC (0, 5) # 1, # 4 | CAZAC (0, 5) # 1, # 4 | 1 |

FIG.9

| SIGNATURE NUMBER | RECEPTION LEVEL | INITIAL TRANSMISSION (FIRST TRANSMISSION) | RETRANSMISSION (SECOND TRANSMISSION) | RETRANSMISSION (THIRD TRANSMISSION) |
|---|---|---|---|---|
| # 1 | LOW | CAZAC (0, 0) | CAZAC (1, 0) | CAZAC (1, 4) |
| # 2 | LOW | CAZAC (0, 1) | CAZAC (1, 1) | CAZAC (1, 5) |
| # 3 | MEDIUM | CAZAC (0, 2) | CAZAC (1, 2) | × |
| # 4 | MEDIUM | CAZAC (0, 3) | CAZAC (1, 3) | × |
| # 5 | HIGH | CAZAC (0, 4) | × | × |
| # 6 | HIGH | CAZAC (0, 5) | × | × |

FIG.10

RADIO COMMUNICATION SYSTEM, MOBILE STATION APPARATUS, AND RACH TRANSMISSION METHOD

TECHNICAL FIELD

The present invention relates to a radio communication system, a mobile station apparatus and a RACH transmission method.

BACKGROUND ART

Presently, studies are underway to use RACH (Random Access Channel) for initial access from a radio communication mobile station apparatus (hereinafter simply "mobile station") to a radio communication base station apparatus (hereinafter simply "base station"), in 3GPP RAN LTE (long term evolution) (e.g. see Non-Patent Document 1). The RACH is utilized in initial access, for example, upon making an association request and a resource request to the base station, and acquiring uplink transmission timing synchronization.

A mobile station transmitting a RACH signal selects one of a plurality of unique signatures in the RACH and transmits the selected signature to the base station to distinguish itself from other mobile stations transmitting RACH signals.

Moreover, in the RACH, taking into account that a plurality of signatures are transmitted from a plurality of mobile stations at the same time, studies are underway to use code sequences of low cross-correlation and high autocorrelation as signatures so as to demultiplex and detect those signatures in the base station. As a code sequence having such characteristics, the CAZAC (Constant Amplitude Zero Auto-Correlation) sequence is known, which is one of GCL (Generalized Chirp-Like) sequences (e.g. see Non-Patent Document 2).

As shown in FIGS. 1A to 1C, RACH frame configurations where preamble parts and message parts are time-multiplexed, are proposed (e.g. see Non-Patent Document 1). The transmission power of the preamble part and the message part can be determined by open-loop transmission power control. Open-loop transmission power means to determine uplink transmission power using downlink common channel received levels. The base station maintains constant received power between the mobile stations of different propagation losses, so that the rate of detection of the RACHs of a plurality of mobile stations is improved.

Moreover, the rate of detection of the RACH is improved through transmission in different access slot lengths according to the size of propagation loss.

Non-patent Document 1: 3GPP TSG-RAN WG1 LTE Ad Hoc Meeting, R1-060047, NTT DoCoMo, NEC, Sharp, "Random Access Transmission in E-UTRA Uplink," Helsinki, Finland, 23-25 Jan. 2006

Non-patent Document 2: 3GPP TSG-RAN WG1 LTE Ad Hoc Meeting, R1-060046, NTT DoCoMo, NEC, Sharp, "Orthogonal Pilot Channel Structure in E-UTRA Uplink," Helsinki, Finland, 23-25 Jan. 2006

DISCLOSURE OF INVENTION

Problems to be Solved by the Invention

However, in the above described technique, enormous radio resources need to be kept for the mobile stations of large propagation loss, and so, there is a problem of poor resource efficiency. This reason will be described below in detail.

Assumed is the random access where the mobile station performs open-loop transmission power control depending on the size of propagation loss. As a result, transmission is carried out with an access slot of a longer length when the transmission power of random access is beyond the power value of the maximum transmission power the mobile station has. Consequently, to accommodate the mobile stations of large propagation loss, it is necessary to keep an enormous amount of radio resources in advance, and so radio resource efficiency is poor.

It is therefore an object of the present invention to provide a radio communication system, mobile station apparatus and RACH transmission method that make it possible to transmit the RACH with a small amount of radio resources.

Means for Solving the Problem

The radio communication system of the present invention adopts a configuration including: a mobile station apparatus that, when the mobile station apparatus transmits a random access channel a plurality of times, carries out transmission using codes associated with one another used for each transmission according to a predetermined rule; and a base station apparatus that combines the random access channel transmitted from the mobile station apparatus the plurality of times based on the predetermined rule.

Advantageous Effect of the Invention

According to the present invention, RACHs are received and combined in a base station, and the present invention provides an advantage of transmitting RACHs with a small amount of radio resources.

BRIEF DESCRIPTION OF DRAWINGS

FIG. 3 shows a code table according to Embodiment 1;
FIG. 6 shows a code table according to Embodiment 2;
FIG. 9 shows a code table according to Embodiment 3;
and
FIG. 10 shows a variation of the code tables according to the present invention.

BEST MODE FOR CARRYING OUT THE INVENTION

Figure 1A:
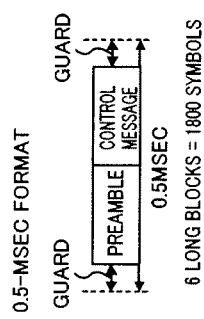
FIG. 1A shows a frame format of the RACH.
Figure 1B:
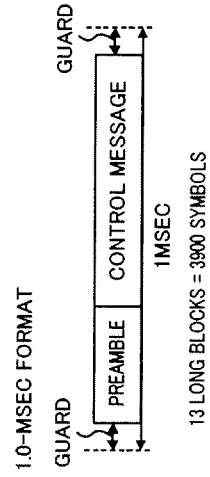
FIG. 1B shows a frame format of the RACH.
Figure 1C:
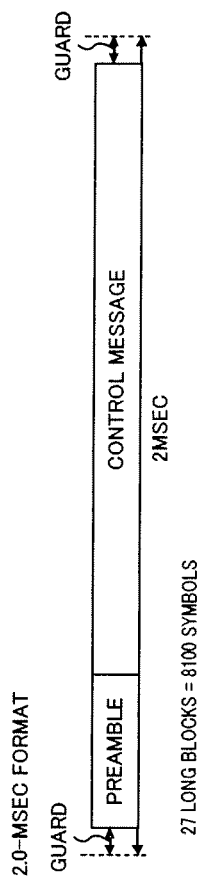
FIG. 1C shows a frame format of the RACH.

Now, embodiments of the present invention will be described in detail with reference to the accompanying drawings. In the description, a plurality of components having the same functions will be assigned the same reference numerals, and different branch numbers are further assigned following the reference numerals to distinguish between the components.

Embodiment 1

In Embodiment 1 of the present invention, in the RACH between the mobile station and the base station, a retransmission code, which is different from the initial transmission code, is used and transmitted, so that the base station is allowed to combine the received signals (received combination). This makes it possible to reduce the amount of radio resources used for RACH signals and improve the radio resources efficiency.

Figure 2:
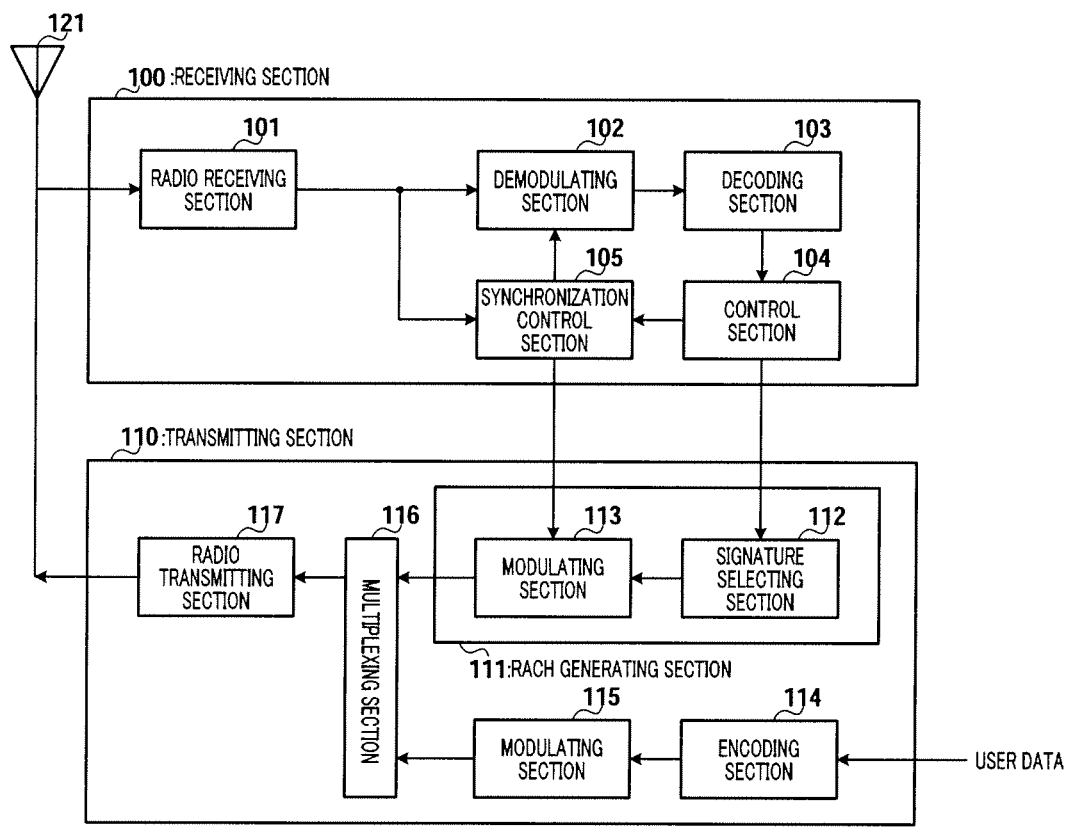
FIG. 2 is a block diagram showing the main configuration of the mobile station apparatus according to Embodiment 1.

FIG. 2 is a block diagram showing the main configuration of the mobile station apparatus according to Embodiment 1 of the present invention. Here, the random access transmitting side will be explained as "the mobile station apparatus," and the random access receiving side will be explained as "the base station apparatus."

The mobile station apparatus of the present embodiment is broadly divided into receiving section 100 and transmitting section 110. Receiving section 100 has radio receiving section 101, demodulating section 102, decoding section 103, control section 104 and synchronization control section 105, and, transmitting section 110 has RACH generating section 111 (signature selecting section 112 and modulating section 113), encoding section 114, modulating section 115, multiplexing section 116 and radio transmitting section 117. Antenna 121 is shared by the transmitting section and the receiving section.

Each section of the mobile station apparatus according to the present embodiment operates as follows. First, transmitting section 110 is explained.

RACH generating section 111 is constructed of signature selecting section 112 and modulating section 113, and generates a RACH signal as follows. That is, signature selecting section 112 selects one of a plurality of unique code sequences as a signature, according to inputted information of the number of times the RACH is transmitted, and outputs the selected code sequence to modulating section 113. The signature (code sequence) selection processing will be described later in detail. Modulating section 113 modulates the signature (code sequence) to generate a RACH signal and outputs the RACH signal to multiplexing section 116.

Encoding section 114 performs error correcting encoding including turbo encoding and convolutional encoding for user data, and outputs the signal after encoding to modulating section 115.

Modulating section 115 performs modulating processing such as QPSK and 16QAM for the user data after encoding, and outputs the modulated signal to multiplexing section 116.

Multiplexing section 116 time multiplexes the RACH signal inputted from modulating section 113 and the user data inputted from modulating section 115, and outputs the multiplexed signal to radio transmitting section 117. That is, multiplexing section 116 outputs the user data to radio transmitting section 117 after the RACH signal is transmitted.

Radio transmitting section 117 performs radio processing including frequency conversion and up-conversion on the multiplexed RACH signal and user data, and transmits them to the base station via antenna 121.

Next, receiving section 100 will be explained in detail.

Radio receiving section 101 receives a signal from the base station via antenna 121, performs radio processing including down-conversion and frequency conversion, and outputs the received signal to synchronization control section 105 and demodulating section 102.

Synchronization control section 105 carries out the synchronization acquisition and the synchronization capture using pilots included in a received signal, and outputs timing information where the synchronization capture is carried out to demodulating section 102 and modulating section 113. Moreover, if the mobile station is engaged in communication, synchronization control section 105 outputs the transmission timing information to modulating section 113 without updating RACH transmission timing, using information showing the RACH is engaged in communication.

Demodulating section 102 demodulates the received signal at the timing of synchronization acquisition in synchronization control section 105, and outputs the demodulated signal to decoding section 103.

Decoding section 103 decodes the demodulated received signal and outputs it to control section 104.

Control section 104 outputs the information showing the RACH is engaged in communication to synchronization control section 105 and extracts control signal related to the RACH (an ACK message of the RACH) from the decoded received signal. If ACK response is not included, control section 104 increments the number of times the RACH is transmitted by 1, and outputs the information of the number of times the RACH is transmitted to signature selecting section 112.

Next, the processing of code sequence selection in signature selecting section 112 will be described in detail.

In the present embodiment, GCL sequences or CAZAC sequences are used as signatures (code sequences). A CAZAC sequence is a code sequence of high autocorrelation and low cross-correlation and having frequency response characteristics of fixed amplitude. An example of using CAZAC sequences as signatures (code sequences) will be explained below.

Signature selecting section 112, which has a code table shown in FIG. 3, selects one of the numbers as a signature number on a random basis, and selects one of the CAZACs (k,m) with reference to the table shown in FIG. 3 based on inputted information about the number of times the RACH is transmitted.

In the table shown in FIG. 3, if signature number #1 is selected, CAZAC (0,0) is selected when the number of times the RACH is transmitted is 1, that is, upon the initial transmission, and CAZAC (1,0) is selected when the number of times the RACH is transmitted is 2. Moreover, if signature number #2 is selected, CAZAC (0,1) is selected when the number of times the RACH is transmitted is 1, and CAZAC (1,1) is selected when the number of times the RACH is transmitted is 2. The same applies to signature numbers #3 to #8. That is, according to the present embodiment, different codes are assigned for one signature number and for the number of times the RACH is transmitted. Moreover, when the number of transmissions is beyond the number of transmissions in the reference table, the selection returns to the code for the initial transmission. That is, the code for the third transmission and the code for the first transmission are the same, and the code for the fourth transmission and the code for the second transmission are the same.

Here, the CAZAC (k,m) will be explained further in detail. k represents the base code sequence of a CAZAC sequence and m represents a CAZAC sequence cyclically shifted by given length Δ. Moreover, in the table shown in FIG. 3, cyclic shifted CAZAC sequences, which are cyclically shifted from a single CAZAC sequence, are used as the codes in a single transmission.

Figure 4:
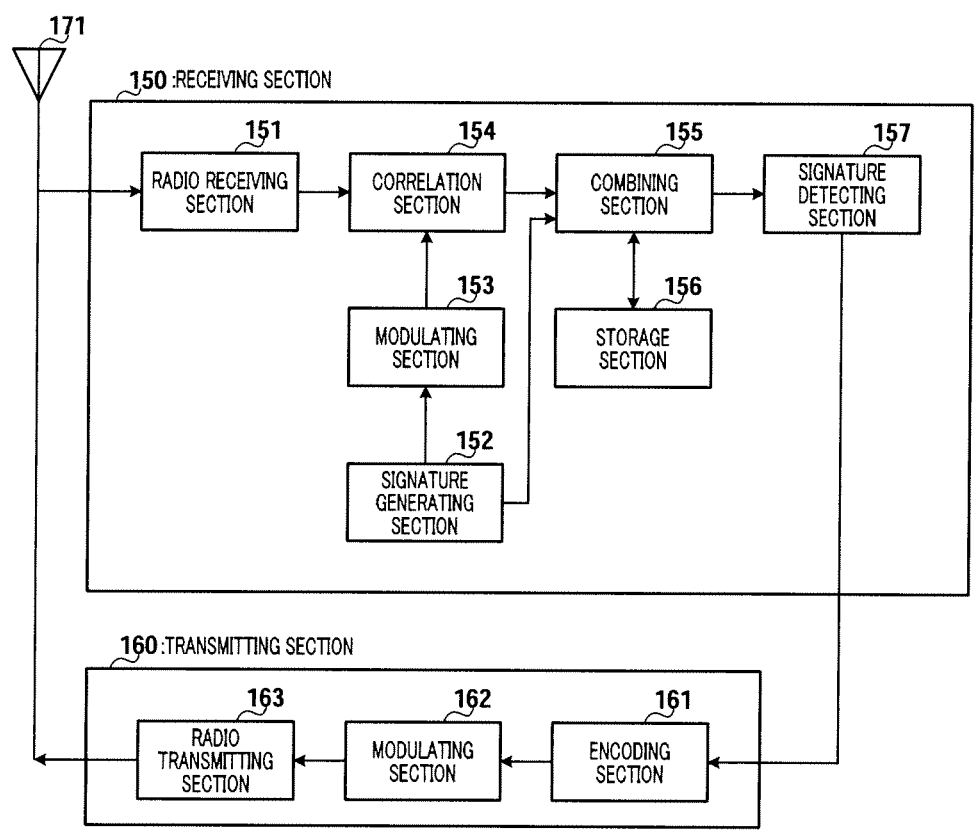
FIG. 4 is a block diagram showing the main configuration of the base station apparatus according to Embodiment 1.

FIG. 4 is a block diagram showing the main configuration of the base station apparatus according to the present embodiment.

Signature generating section 152, which has the same code table as in the mobile station shown in FIG. 3, outputs all of the code sequences in the table to modulating section 153 and combining section 155.

Modulating section 153 modulates all of the code sequences and outputs all of the modulated signals to correlation section 154.

Correlation section 154 finds correlation between the signals where all of the code sequences are modulated and a received signal, and outputs the respective correlation signals to combining section 155.

Combining section 155 combines and stores the correlation signals per signature using the table shown in FIG. 3, and outputs the correlation signals combined per signature to signature detecting section 157. Combining section 155 and storage section 156 will be described later in detail.

Signature detecting section 157 detects the signature numbers using the combined correlation signals, and outputs an ACK signal to encoding section 161 when the signature number can be detected, and outputs a NACK signal to encoding section 161 when the signature number cannot be detected.

Next, the processing in combining section 155 and storage section 156 will be explained in detail.

Here, the random access retransmission interval is defined as ΔT. The table shown in FIG. 3, for example, in the case of acquiring a correlation signal with which signature #1 is combined, first, the correlation result of CAZAC (0,0) is stored in storage section 156 from the correlation signals on which correlation processing is performed between the received signal and CAZAC (0,0), and the received signal and CAZAC (1,0). Further, similar processing is performed after time ΔT, and the correlation signal after time ΔT is stored in storage section 156. Combining section 155 performs additive combining of the power for the stored correlation signal of CAZAC (0,0) before time ΔT and the power for the correlation signal of CAZAC (1,0) at the current time, and outputs the correlation signal after combining and the correlation signal of CAZAC (0,0) at the current time, that is, the correlation signal without combining to signature detecting section 157.

By performing these processing, it is possible to acquire a correlation signal after combining and improve the rate of signature detections.

Further, while RACH is engaged in access, RACH transmission without updating the RACH transmission timings improves the combining gain per path, and, as a result, the rate of signature detection can be further improved.

In this way, according to the present embodiment, different codes are assigned for each number of transmissions in the RACH used for communication between the mobile station and the base station. Moreover, the codes for each transmission are associated with one another. In other words, when the RACH is transmitted a plurality of times, the codes used for each transmission are related each other by predetermined rules. By this means, even when the base station receives a plurality of RACHs, the codes included in the RACHs are transmitted according to the above rules, so that the base station can distinguish the codes transmitted from a single mobile station from other codes. Consequently, the base station combines the correlation signals transmitted from a single mobile station a plurality of times and can improve reception performance. As a result, it is possible to reduce the amount of radio resources used for assigning to the RACH and improve the radio resource efficiency in the communication system.

Moreover, according to the present embodiment, the code table provided in association with the number of transmissions, this code table is had both in the transmitting side and the receiving side. This allows identifying the same mobile station easily, so that it is possible to reduce the amount of radio resources used for RACH signals and improve the radio resource efficiency.

Moreover, according to the present embodiment, complete orthogonal code sequences are preferentially assigned to the initial transmission codes. By this means, interference between users upon the initial transmission can be reduced, so that it is possible to reduce the amount of radio resources used for RACH signals and improve the radio resource efficiency.

Moreover, according to the present embodiment, orthogonal code sequences that are not completely orthogonal are preferentially assigned to the retransmission codes. By this means, the rate of collisions between users upon the retransmission can be reduced, so that it is possible to reduce the amount of radio resources used for RACH signals and improve the radio resource efficiency.

Moreover, according to the present embodiment, cyclic shift CAZAC sequences are preferentially assigned to the initial transmission codes, and different CAZAC sequences are preferentially assigned to the retransmission codes. By this means, interference between users upon the initial transmission and the rate of collisions between users upon the retransmission can be reduced, so that it is possible to reduce the amount of radio resources used for RACH signals and improve the radio resource efficiency.

Moreover, according to the present embodiment, the timings transmitting random access in the mobile station apparatuses are not changed in access intervals during random access. This makes it possible to improve combining gain, to reduce the amount of radio resources used for RACH signals and to improve the radio resource efficiency.

Moreover, although a configuration has been explained as an example with the present embodiment where CAZAC sequences are used in the reference table, the present embodiment is not limited to this.

Moreover, although configurations have been explained as an example where the cyclic shift CAZAC sequences are used upon the initial transmission and the different CAZAC sequences are used upon the retransmission, the present embodiment is not limited to this, and, the complete orthogonal code sequences may be preferentially assigned to the initial transmission codes and orthogonal code sequences that are not completely orthogonal may be preferentially assigned to the retransmission codes.

Moreover, although configurations have been explained as an example where two codes are used as retransmission codes, three or more codes may be used.

Moreover, although a configuration of the additive combining of power has been explained as the combining method of correlation signals, the in-phase additive combining may also be adopted, and, a configuration may also be adopted to select the higher combining gain between additive combining of power and in-phase additive combining.

Embodiment 2

In the Embodiment 2 of the present invention, in the RACH between the mobile station and the base station, the retransmission code different from the initial transmission code is used. In addition, depending on the priorities of random access, more codes are used and transmitted when the priority is high and fewer codes are used and transmitted when the priority is low.

This allows the base station to combine received signals. This makes it possible to reduce the amount of radio resources used for RACH signals and improve the radio resource efficiency, additionally, it is possible to reduce interference and the rate of collisions in the random access of high priorities.

Figure 5:
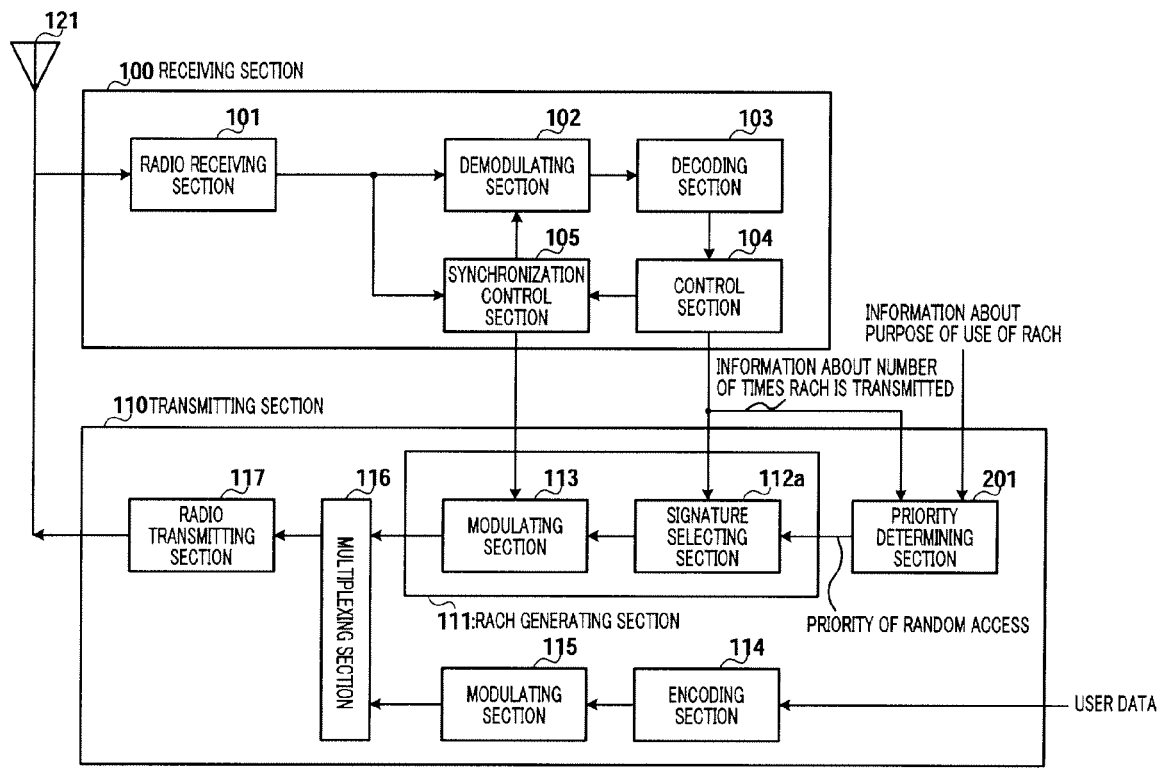
FIG. 5 is a block diagram showing the main configuration of the mobile station apparatus according to Embodiment 2.

FIG. 5 is a block diagram showing the main configuration of the mobile station apparatus according to the present embodiment. This mobile station apparatus has the same basic configuration as the mobile station shown in Embodiment 1 (see FIG. 2). The components having the same functions are assigned the same reference numerals and overlapping descriptions are omitted. Further, the components having the same basic operations but differs in details are assigned an alphabet "a" to the same reference numerals and are explained as appropriate.

The mobile station according to the present embodiment is significantly different from the mobile station shown in Embodiment 1 in having priority determining section 201.

Signature selecting section 112a selects one of a plurality of unique code sequences as a signature, according to information of the number of times the RACH is transmitted inputted from control section 104, and the priority of random access inputted from priority determining section 201, and outputs the selected code sequence to modulating section 113.

Priority determining section 201 determines the priority of random access by a threshold decision, according to the information about the number of times the RACH is transmitted and the information about the purpose of use of the RACH, and outputs the determined the priority of random access to signature selecting section 112a.

To be more specific, the priority level is determined according to equation 1 below.

(Equation 1)

The priority level=the initial value of the priority level+the information about the number of times the RACH is transmitted×α    [1]

Here, the initial value of the priority level is fixed depending on the purpose of use of the RACH. Moreover, α is an offset value of the priority level by the number of times the RACH is transmitted.

The priority of random access is determined by comparing priority threshold information (to be more specific, priority threshold A and priority threshold B) with the priority level calculated in priority determining section 201 as described above.

The priority of random access is determined "high" if the priority level is higher than priority threshold A, the priority of random access is determined "medium" if the priority level is lower than priority threshold A and higher than priority threshold B, and the priority of random access is determined "low" if the level of priority is lower than priority threshold B.

Next, the processing of code sequence selection in signature selecting section 112a will be explained in detail.

In the present embodiment, one code sequence is selected as a signature according to information about the number of times the RACH is transmitted and the priorities of random access. Signature selecting section 112a, which has a table shown in FIG. 6, selects one of the numbers as a signature number on a random basis, and selects one of the CAZACs (k,m) with reference to the table shown in FIG. 6 based on inputted information about the number of times the RACH is transmitted and the priority of random access.

In the table shown in FIG. 6, for example, if the priority of random access is "high" and signature number #1 is selected, CAZAC (0,0) is selected when the number of times the RACH is transmitted is 1, that is, upon the initial transmission, CAZAC (1,0) is selected when the number of times the RACH is transmitted is 2, and CAZAC (1,4) is selected when the number of times the RACH is transmitted is 3.

Moreover, if the priority of random access is "medium" and signature number #3 is selected, CAZAC (0,2) is selected when the number of times the RACH is transmitted is 1, CAZAC (1,2) is selected when the number of times the RACH is transmitted is 2, and CAZAC (0,2), which is the same as in the number of times the RACH is transmitted is 1, is selected when the number of times the RACH is transmitted is 3. "x" in the figure means that the same CAZAC sequence as in the first transmission is selected and a new CAZAC sequence is not selected. That is, in the present embodiment, the unique codes are assigned to one signature number formed with the priority of random access and the number of times the RACH is transmitted, and, the number of codes that can be used (i.e. the number of resources) varies depending on the priorities of random access. Furthermore, by restricting the codes the random access of low priority can use, it is possible to reduce the number of codes multiplexed at the same time, interference in the random access and the rate of collisions between the RACHs.

In this way, according to the present embodiment, the mobile station has a code table provided in association with codes used for each number of transmissions (the number of retransmissions) according to priority and received quality, and transmits the RACH using more codes when the priority is high and using fewer codes when the priority is low. By this means, the base station can receive and combine the RACH transmitted a plurality of times.

By this means, users of high priority have an advantage of reduced interference and reduced rate of collisions, so that it is possible to reduce the amount of radio resources used for assigning to the RACH and improve the radio resource efficiency in the communication system.

Embodiment 3

In Embodiment 3 of the present invention, in the communication between the mobile station and the base station, dedicated time slots for the RACH transmission use (simply "access slots" or "random access slots") are set, and the access slots that can be used are distinguished by the number of transmissions. If three access slots are set in a frame and they are access slot #1 to #3, respectively, the mobile station transmits the initial transmission (the first transmission) data alone in access slot #1, the first retransmission (the second transmission) data alone in access slot #2, and the second retransmission data (the third transmission) alone in access slot #3. By this means, the base station can realize that the RACHs transmitted a plurality of times are transmitted from a single mobile station according to the above described rules, so that the base station can combine these received signals.

Moreover, the mobile stations are classified into a plurality of groups, for example, groups #1 to #3. The rules described above apply only to the mobile stations in group #1, and different rules apply to the mobile stations in groups #2 and #3. To be more specific, the access slots that can be used are distinguished by the number of transmissions, and, for example, the mobile stations in group #2 is allowed to transmit the initial transmission (first transmission) data alone in access slot #1, the first retransmission (second transmission) data alone in access slot #2, and again the initial transmission (first transmission) data alone in access slot #3. Moreover, the mobile stations in group #3 are allowed to transmit data freely regardless of the number of transmissions. The distinction between the groups is realized by setting the codes that can be used, to different codes between the groups.

Furthermore, in the present embodiment, the mobile station uses and transmits more access slots when the priority is high, and uses and transmits fewer access slots when the priority is low. This makes it possible to have an advantage of reduced interference and reduced rate of collisions in random access of high priority.

Figure 7:
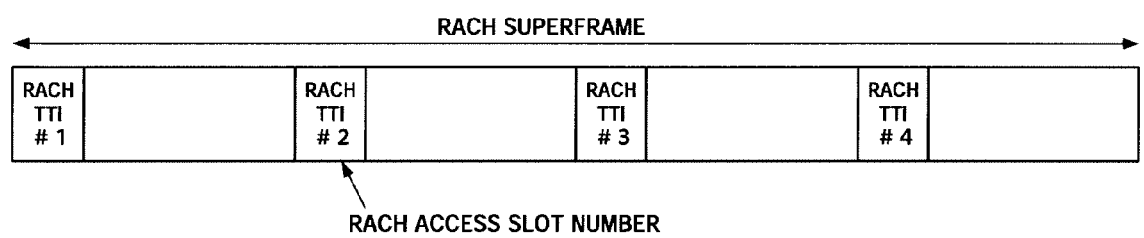
FIG. 7 shows a configuration of the random access slot according to Embodiment 3.

FIG. 7 shows a configuration of the random access slot according to the present embodiment. Here, a configuration will be explained as an example where four access slots are provided in one frame. This frame is called a "RACH super frame (or simply "super frame")."

Referring to FIG. 7, the RACH super frame is formed with a plurality of RACH TTIs (i.e. random access slots) and other data channels, the random access slot number is uniquely set from the beginning slot of the super frame.

Figure 8:
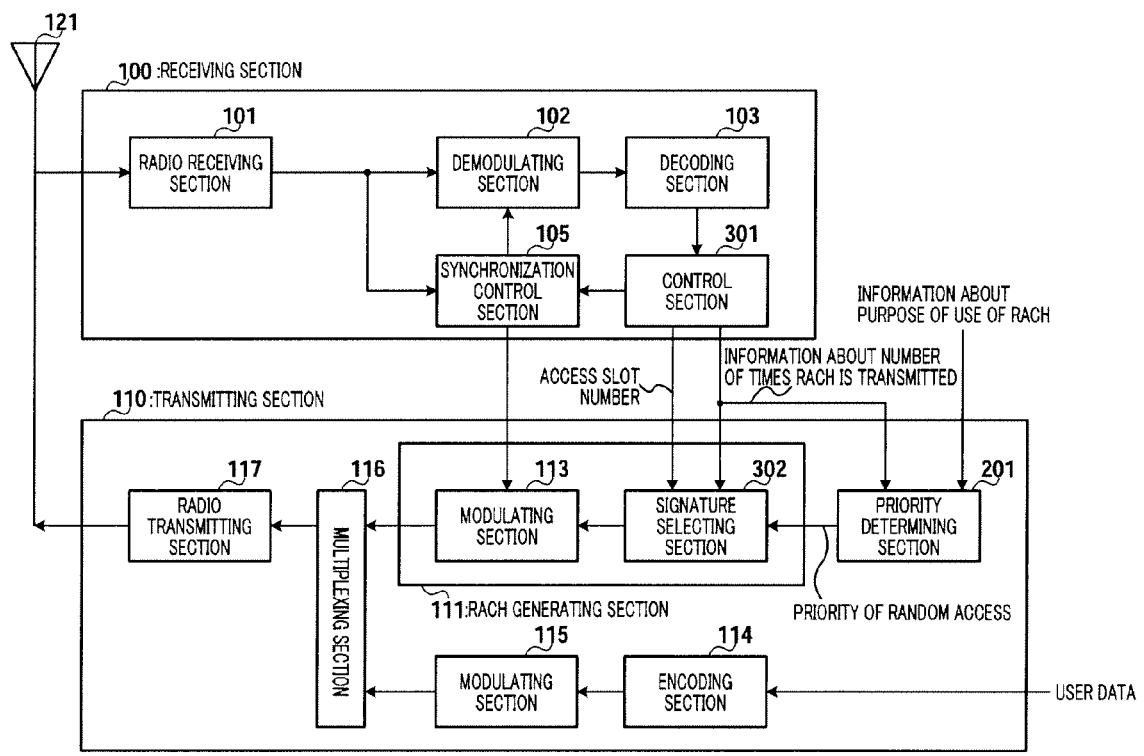
FIG. 8 is a block diagram showing the main configuration of the mobile station apparatus according to Embodiment 3.

FIG. 8 is a block diagram showing the main configuration of the mobile station apparatus according to Embodiment 3. This mobile station apparatus has the same basic configuration as the mobile station shown in Embodiment 2 (see FIG. 5). The components having the same functions are assigned the same reference numerals and overlapping descriptions are omitted.

The mobile station according to the present embodiment is significantly different from the mobile station shown in Embodiment 2 in having control section 301 and signature selecting section 302.

Signature selecting section 302 selects one of a plurality of unique code sequences as a signature, according to information about the number of times the RACH is transmitted and the access slot number that are inputted from control section 301 and the priority of random access inputted from priority determining section 201, and outputs the selected code sequence to modulating section 113.

Next, code sequence selecting processing in signature selecting section 302 will be explained in detail.

In the present embodiment, one code sequence is selected as a signature according to information about the number of times the RACH is transmitted, the access slot number and the priority of random access. Signature selecting section 302, which has the table shown in FIG. 9, selects one of the numbers as a signature number on a random basis, and selects one of the CAZACs (k,m) with reference to the table shown in FIG. 9 based on inputted information about the number of times the RACH is transmitted and the priority of random access.

In the table shown in FIG. 9, for example, if the priority of random access is "high" and signature number #1 is selected, CAZAC (0,0) is selected when the number of times the RACH is transmitted is 1, that is, upon the initial transmission and transmitted when the access slot number is #1. CAZAC (0,0) is selected when the number of times the RACH is transmitted is 2 and transmitted when the access slot number is #2. If an ACK response is acquired in the second transmission, the retransmission processing (i.e. RACH transmission) is finished at this stage. However, if an ACK response is not acquired in the second transmission, retransmission processing is further continued. In this case, CAZAC (0,0) is selected when the number of times the RACH is transmitted is 3 and transmitted when the access slot number is #3. If the ACK response is still not acquired, CAZAC (0,0) is selected when the number of times the RACH is transmitted is 4 and transmitted when the access slot number is #4.

Moreover, if the priority of random access is "medium" and signature number #3 is selected, CAZAC (0,2) is selected when the number of times the RACH is transmitted is 1 and 3, and transmitted when the access slot number is #1 or #3. CAZAC (0,2) is selected when the number of times the RACH is transmitted is 2 and 4, and transmitted when the access slot number is #2 or #4.

Moreover, if the priority of random access is "low" and signature number #5 is selected, CAZAC (0,4) is selected regardless of the number of times the RACH is transmitted, and transmitted when the access slot number is #1 or #3. Moreover, if signature number #6 is selected, CAZAC (0,5) is selected and transmitted when the access slot number is #1 or #4.

That is, with the present embodiment, different access slots are assigned to one signature number formed with the priority of random access and the number of times the RACH is transmitted, and, the number of access slots that can be used, that is, the amount of radio resources that can be used varies depending on the priorities of random access. Furthermore, by restricting the access slots the random access of low priority can use, it is possible to reduce the number of codes multiplexed at the same time, interference in the random access and the rate of collisions between the RACHs.

In this way, according to the present embodiment, the mobile station apparatus uses access slots that are different from access slots upon the initial transmission, that is, assigns different access slots for each number of retransmission, and has an access slot table provided in association with the number of retransmissions (transmissions). By this means, a single mobile station can be easily identified by having the access slot table provided in association with each number of retransmissions in the transmitting side and the receiving side, so that it is possible to combine correlation signals transmitted a plurality of times from a single mobile station and improve received performance, to reduce the amount of radio resources used for assigning to the RACH and improve radio resource efficiency in the communication system.

Moreover, according to the present embodiment, the access slot number is defined in the mobile station apparatus and the base station apparatus. This allows acquiring the access slot number easily, so that it is possible to reduce the amount of radio resources used for the RACH signals and improve the radio resource efficiency.

Moreover, according to the present embodiment, the mobile station apparatus has the access slot table provided in association with each number of retransmissions according to priority and received quality. For example, depending on the priorities of random access, more access slots are used and transmitted when the priority is high and fewer codes are used and transmitted when the priority is low. By this means, users of high priority have an advantage of reduced interference and reduced rate of collisions, so that it is possible to reduce the amount of radio resources used for RACH signals and improve the radio resource efficiency.

Moreover, according to the present embodiment, the transmission timings of random access in the mobile station apparatuses are not changed in access intervals during random access. This makes it possible to improve combining gain, to reduce the amount of radio resources used for RACH signals and improve the radio resource efficiency.

The embodiments of the present invention have been explained.

The radio communication system, the mobile station apparatus and the RACH transmission method are not limited to the embodiments described above, and can be implemented by modifying in various ways. For example, the embodiments may be implemented in the combination of themselves as appropriate.

Moreover, although examples have been explained with the description where CAZAC sequences are used in the reference tables, the present invention is not particularly limited to this.

Moreover, although examples of configurations have been explained with the description where the priority of random access is used, a reference table according to downlink reception levels may also be used. FIG. 10 shows an example of code tables in this case. The downlink reception level decreases when the mobile station is farther from the center of a cell, that is, the base station, so that "low," "medium" and "high" downlink reception levels in FIG. 10 may be "far," "medium" and "close" distances from the base station. That is, the mobile stations at the center of the cell and the mobile stations at the cell edge may refer to the code table shown in FIG. 10 according to the distance from the base station.

Moreover, although cases have been described with the embodiments above where the present invention is configured by hardware, the present invention may be implemented by software. For example, by describing the RACH transmission method according to the present invention in a programming language, storing this program in a memory and making the information processing section execute this program, it is possible to implement the same function as the mobile station apparatus of the present invention.

Each function block employed in the description of the aforementioned embodiment may typically be implemented as an LSI constituted by an integrated circuit. These may be individual chips or partially or totally contained on a single chip.

"LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-126455, filed on Apr. 28, 2006, including the specification, drawings and abstract, is incorporated herein by reference in its entirety.

INDUSTRIAL APPLICABILITY

The radio communication system, the mobile station apparatus and the RACH transmission method according to the present invention are applicable to use in, for example, mobile communication systems standardized in 3GPP LTE and communication terminal apparatuses used in the systems.

The invention claimed is:

1. A radio communication system comprising:
a mobile station apparatus that carries out an initial transmission of a signal in a random access channel (RACH) using one of a plurality of sequences, and carries out at least one retransmission of the signal in the RACH using the one of the plurality of sequences; and
a base station apparatus that combines the signal transmitted in the initial transmission with the signal transmitted in the retransmission from the mobile station apparatus based on the plurality of sequences, wherein:
a plurality of predetermined time slots in a RACH frame for use in the initial transmission and the retransmission of the signal are set in advance for the initial transmission and the retransmission; and
a transmission number of the signal is used as an index for performing a unique determination of which of the plurality of predetermined time slots in the RACH frame is used for the initial transmission and the retransmission of the signal in the transmission number, wherein, in said determination, a first time slot of the predetermined time slots is used only for the initial transmission and a second time slot of the predetermined time slots is used only for the retransmission.

2. The radio communication system according to claim 1, wherein the plurality of predetermined time slots are assigned at invariable time intervals in a RACH period.

3. A mobile station apparatus comprising:
a transmitter configured to carry out an initial transmission of signal in a random access channel (RACH) using one of a plurality of sequences and carry out at least one retransmission of the signal in the RACH using the one of the plurality of sequences, wherein:
a plurality of predetermined time slots in a RACH frame for use in the initial transmission and retransmission of the signal are set in advance for the initial transmission and the retransmission; and
a transmission number of the signal is used as an index for performing a unique determination of which of the plurality of predetermined time slots in the RACH frame is used for the initial transmission and the retransmission of the signal in the transmission number, wherein, in said determination, a first time slot of the predetermined time slots is used only for the initial transmission and a second time slot of the predetermined time slots is used only for the retransmission.

4. A base station apparatus, comprising:
a receiver configured to receive signals, which are transmitted in an initial transmission and at least one retransmission in a random access channel (RACH) using one of a plurality of sequences from a mobile station apparatus; and
a combiner comprising a processor and configured to combine the received signals based on the plurality of sequences, wherein:
a plurality of predetermined time slots in a RACH frame for use in the initial transmission and the retransmission of the signal are set in advance for the initial transmission and the retransmission; and
a transmission number of the signal is used as an index performing a unique determination of which of the plurality of predetermined time slots in the RACH frame is used for the initial transmission and the retransmission of the signal in the transmission number, wherein, in said determination, a first time slot of the predetermined time slots is used only for the initial transmission and a second time slot of the predetermined time slots is used only for the retransmission.

5. A random access channel transmission method performed by a mobile station apparatus comprising, carrying out an initial transmission of signal in a random access channel (RACH) using one of a plurality of sequences, and carrying out at least one retransmission of the signal in the RACH using the one of the plurality of sequences, wherein:
a plurality of predetermined time slots in a RACH frame for use in the initial transmission and the retransmission of the signal are set in advance for the initial transmission and the retransmission; and a transmission number of the signal is used as an index for performing a unique determination of which of the plurality of predetermined time slots in the RACH frame is used for the initial transmission and the retransmission of the signal in the transmission number, wherein, in said determination, a first time slot of the predetermined time slots is used only for the initial transmission and a second time slot of the predetermined time slots is used only for the retransmission.

* * * * *